United States Patent [19]

Gomez Diaz

[11] Patent Number: 5,283,816
[45] Date of Patent: Feb. 1, 1994

[54] SMOKE DETECTOR USING TELEPHONE LINK

[75] Inventor: Leo A. Gomez Diaz, Laredo, Tex.
[73] Assignee: DIP Technologies, Inc., Laredo, Tex.
[21] Appl. No.: 641,490
[22] Filed: Jan. 15, 1991
[51] Int. Cl.⁵ .......................................... H04M 11/04
[52] U.S. Cl. ...................................... 379/40; 379/43; 340/533
[58] Field of Search ............ 379/39, 40, 42–44, 379/51, 355, 354; 340/533, 628–630

[56] References Cited

U.S. PATENT DOCUMENTS

| | | | |
|---|---|---|---|
| 3,038,967 | 6/1962 | Andrews | 379/41 |
| 3,505,476 | 4/1970 | Kelly, Jr. et al. | 379/40 |
| 3,549,810 | 12/1970 | Driscoll et al. | 379/51 |
| 4,032,707 | 6/1977 | Trenary | 340/628 |
| 4,137,429 | 1/1979 | Stockdale | 379/42 |
| 4,371,751 | 2/1983 | Hilligoss, Jr. et al. | |
| 4,413,158 | 11/1983 | Danford | 379/355 |
| 4,417,100 | 11/1983 | Carlson et al. | 379/51 |
| 4,461,927 | 7/1984 | Olson et al. | |
| 4,465,904 | 8/1984 | Gottsegen et al. | 379/42 |
| 4,471,346 | 9/1984 | Nelson et al. | 340/628 |
| 4,491,830 | 1/1985 | Miyabe | |
| 4,493,947 | 1/1985 | Loveless | |
| 4,517,555 | 5/1985 | Marsocci et al. | |
| 4,521,645 | 6/1985 | Carroll | |
| 4,558,181 | 12/1985 | Blanchard et al. | |
| 4,598,174 | 7/1986 | Pommer, II | 379/354 |
| 4,893,324 | 1/1990 | Scown | |
| 4,897,862 | 1/1990 | Nishihara | 379/40 |
| 4,935,952 | 6/1990 | Dutra | 379/40 |
| 4,943,799 | 7/1990 | Papineau | 379/40 |

FOREIGN PATENT DOCUMENTS

| | | | |
|---|---|---|---|
| 0096401 | 12/1983 | European Pat. Off. | 379/40 |
| 8904574 | 5/1989 | World Int. Prop. O. | 379/40 |

*Primary Examiner*—Wing F. Chan
*Attorney, Agent, or Firm*—Flynn, Thiel, Boutell & Tanis

[57] ABSTRACT

A smoke detector includes a housing having therein a sensor for detecting smoke, an arrangement responsive to detection of smoke for producing an audio signal and an audible sound at an audio frequency, a telephone dialer circuit, a telephone jack on the housing for coupling the dialer circuit to a telephone line, and an arrangement responsive to the occurrence of the audio signal for causing the dialer circuit to automatically dial the telephone number. The telephone number may be a single specified digit, or a multi-digit number stored in a last number dialed memory of the dialer circuit. After dialing of the telephone number, the audio signal is supplied to the telephone line regardless of whether an answer occurs at the remote end. After a predetermined time interval, a timer circuit releases the telephone line, waits a predetermined time interval, causes the telephone number to be dialed again, and then causes the audio signal to again be applied to the telephone line. A keypad is provided on the housing to facilitate entry of a telephone number into the last number dialed memory.

27 Claims, 5 Drawing Sheets

SMOKE DETECTOR USING TELEPHONE LINK

FIELD OF THE INVENTION

The present invention relates generally to an apparatus for detecting an alarm condition and, more particularly, to such an apparatus which is coupled to a telephone line and automatically dials a telephone number in response to detection of an alarm condition.

BACKGROUND OF THE INVENTION

There are a variety of commercial systems which are capable of detecting an alarm condition. For example, residential smoke detectors are in wide use and in response to detection of smoke and/or heat produce a piercing audible alarm sound to warn residents of the presence of a fire. Also, there are residential and industrial security systems which will detect fires, unauthorized entry and other types of alarm conditions. The systems may produce an audible sound in the local vicinity of the alarm condition, or may send a signal to a remote location, for example through a dedicated line, a radio link, or a telephone line.

With respect to the transmission of signals to a remote location, the dedicated line is prohibitively expensive in most applications. Further, the radio transmitter and receiver or the telephone dialing circuitry are frequently rather complex, and are thus typically found only in relatively complex units. Therefore, although these units have been generally adequate for their intended purposes, they have not been satisfactory in all respects It is therefore an object of the present invention to provide an arrangement which is capable of automatically dialing a telephone number in response to detection of an alarm condition, but which is relatively simple and inexpensive and is thus suitable for use in almost any application at low expense.

A further object is to provide such a unit in which a sensor, the dialer and the telephone connection arrangement are all provided within a single housing.

SUMMARY OF THE INVENTION

The objects and purposes of the invention, including those set forth above, are met according to a first form of the invention by an apparatus which includes a sensor arrangement for detecting an alarm condition, a dialer integrated circuit having a memory arrangement for storing a telephone number which was most recently dialed, a first arrangement for facilitating connection of the dialer integrated circuit to a telephone line, and a second arrangement responsive to detection of an alarm condition by the sensor for causing the dialer integrated circuit to automatically dial the telephone number.

A different form of the present invention involves an apparatus which includes a sensor for detecting an alarm condition, an arrangement for generating a signal at an audible frequency and producing an audible sound in response to detection of the alarm condition, and a telephone dialer circuit and an arrangement facilitating coupling of the telephone dialer circuit to a telephone line, the telephone dialer circuit being responsive to detection of the alarm condition for automatically dialing a telephone number and thereafter applying to the telephone line the alarm signal at the audible frequency.

A different form of the present invention involves an apparatus which includes a housing, an arrangement for facilitating attachment of the housing to a surface of a wall or ceiling so that a back side of the housing faces the surface, a telephone jack provided on the back side of the housing, a sensor arrangement for detecting an alarm condition, and a dialing arrangement disposed within the housing and coupled to the telephone jack for automatically dialing a telephone number in response to detection of an alarm condition.

Another form of the invention involves an apparatus which includes a sensor for detecting an alarm condition, a dialer circuit and an arrangement facilitating coupling of the dialer circuit to a telephone line, the dialer circuit including a memory for storing a telephone number and an arrangement for automatically dialing the telephone number in response to detection of the alarm condition, and a housing having the dialer circuit therein and having thereon an arrangement for facilitating entry of the telephone number into the memory.

A different form of the invention involves an apparatus having a sensor for detecting an alarm condition, a dialer circuit, an arrangement for coupling the dialer circuit to a telephone line, the dialer automatically dialing a telephone number in response to detection of an alarm condition, and a housing having therein the sensor and the dialer circuit.

BRIEF DESCRIPTION OF THE DRAWINGS

A preferred embodiment of the invention will be described in detail hereinafter with reference to the accompanying drawings, in which.

DETAILED DESCRIPTION

Figure 1:
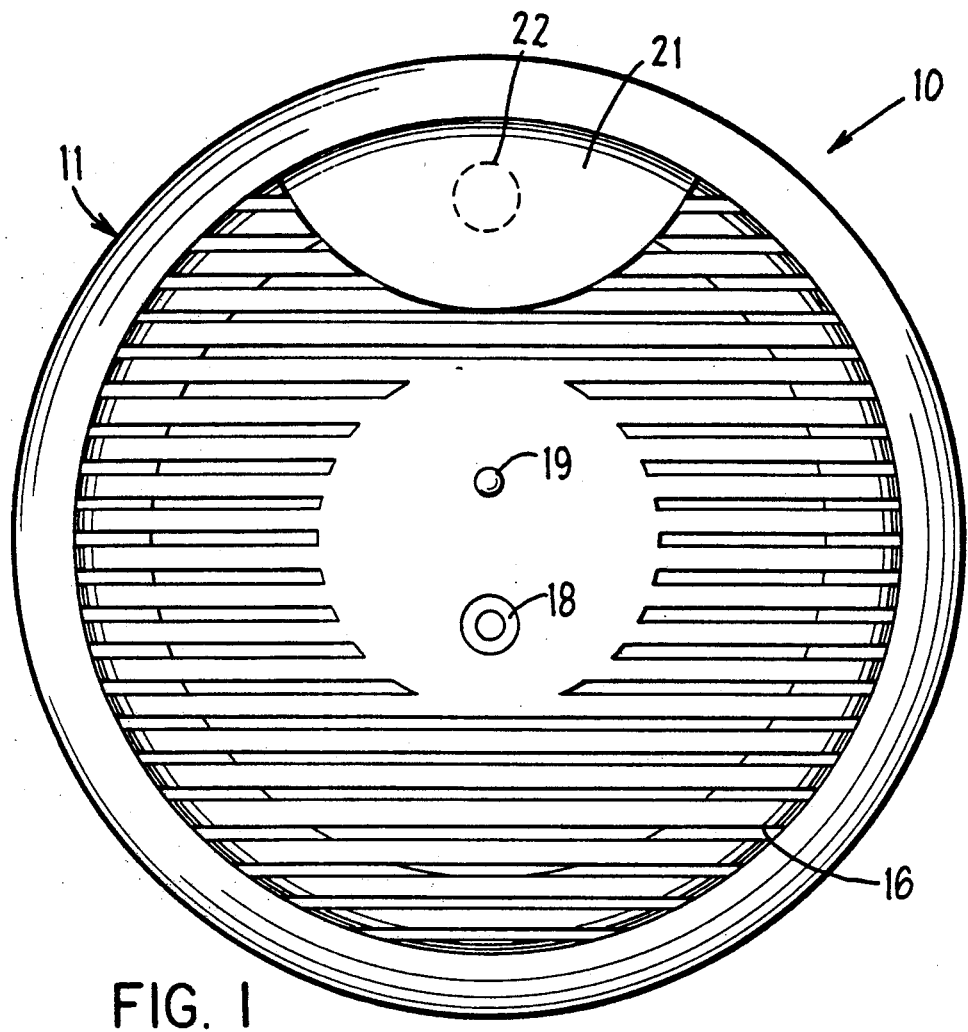
FIG. 1 is a front view of a smoke detector embodying the present invention.
Figure 2:
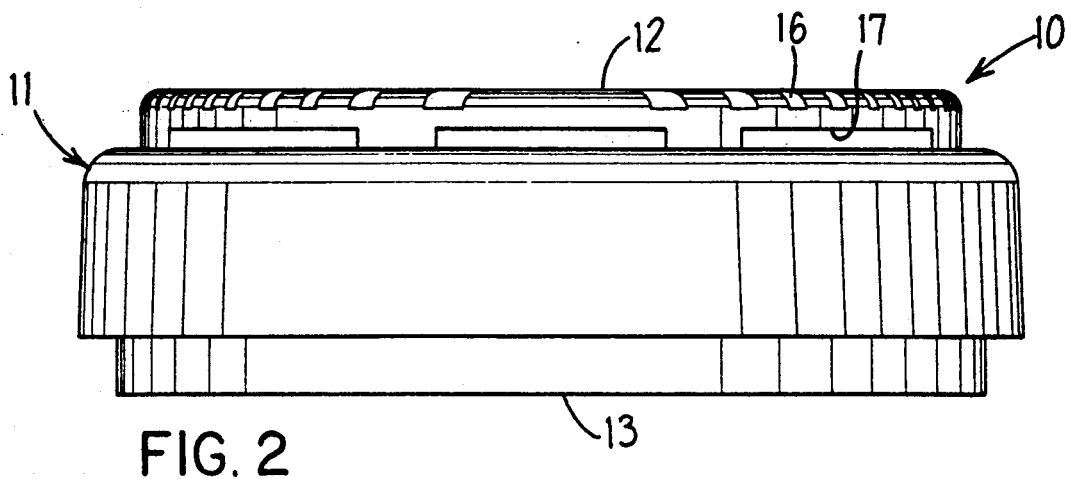
FIG. 2 is a side view of the smoke detector of FIG. 1.

Referring to FIGS. 1 and 2, a smoke detector 10 which embodies the present invention has a circular plastic housing 11 with a front side 12 and a rear side 13. The housing 11 has in the region of the front side thereof a plurality of slots 16 and 17 which permit the entry of smoke, heat and the like into the housing 11 and permit an audible alarm sound generated by the smoke detector to leave the housing 11. In approximately the middle of the front side of the housing is a push-to-test button 18, which can be manually pushed to trigger an alarm in order to verify that the smoke detector 10 is operating properly. Near the push-to-test button 18 is an operating light emitting diode (LED) 19 which is controlled by the circuit within the detector 10 so that it periodically flashes to indicate the detector 10 is operating. Element 20 is a light detector which will trigger an alarm if the light from a flashlight is directed onto it, in order to verify that the detector 10 is operating properly without manually pushing the button 18. Near one side of the front side of housing 11 is a plastic lens 21, and behind the lens 21 is an escape lamp 22 which is lit by the smoke detector 10 following detection of an alarm condition in order to provide light near the detector 10, so that if it is dark people can see as they exit the building.

Figure 3:
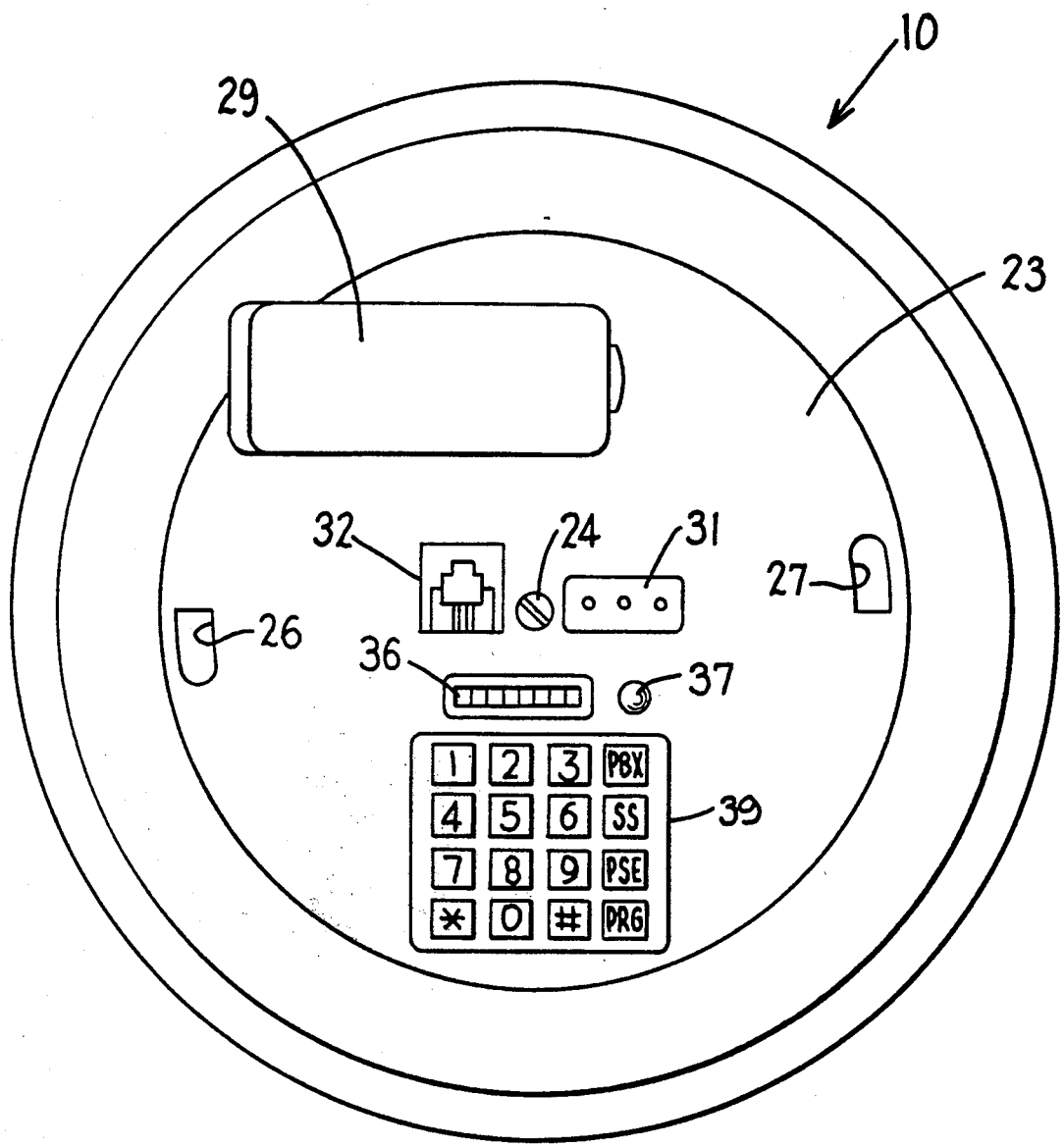
FIG. 3 is a back view of the smoke detector of FIG. 1.
Figure 6:
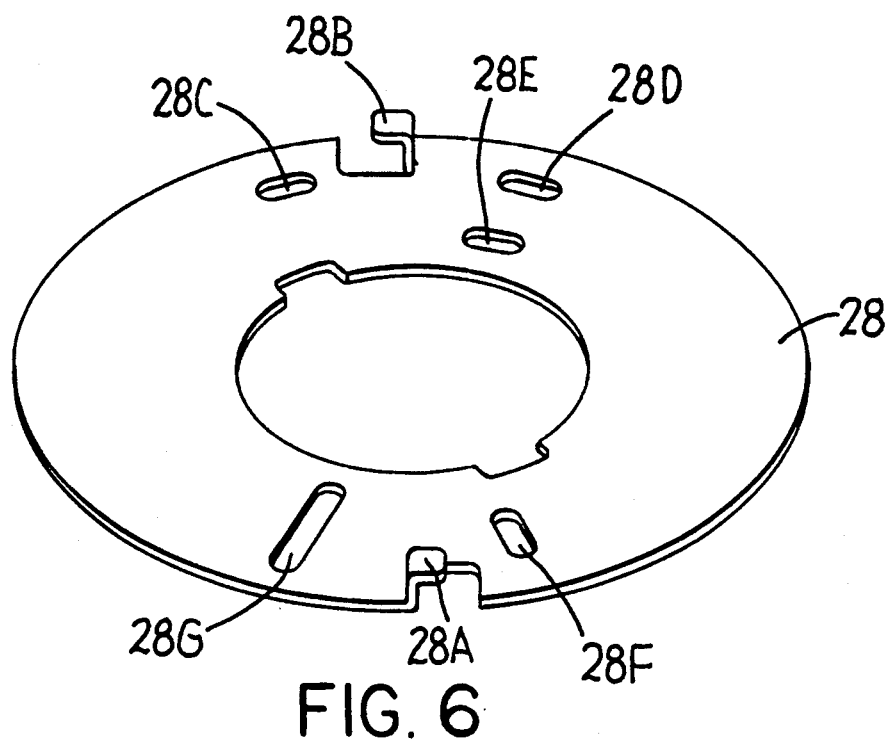
FIG. 6 is a perspective view of a bracket which can support the smoke detector of FIG. 1 on a wall or ceiling.

Referring to FIG. 3, which shows the back side of the smoke detector 10, a circular back plate 23 closes a circular access opening in the back of the housing 11 and is removably secured to the housing 11 by a screw 24. The back plate 23 has two diametrically opposed arcuate slots 26 and 27. Referring to FIG. 6, a circular bracket 28 has several slots 28C-28G through which screws can extend in order to secure the bracket 28 to a wall or a ceiling, or to a standard electrical box disposed in the wall or ceiling. The bracket 28 has two L-shaped locking portions 28A and 28B on diametrically opposite sides thereof, which can each removably engage a respective one of the slots 26 and 27 in the back plate 23 of the housing in order to facilitate removable mounting of the smoke detector 10 on a surface of the wall or ceiling. As shown in FIG. 3, the back plate 23 also has a removable battery cover 29 to cover a compartment which holds batteries for the detector 10, and to permit the batteries to be replaced in the event any of them ever fail. An AC socket 31 accessible through an opening in back plate 23 facilitates releasable connection of a 110 volt AC line cord to the smoke detector 10 in order to permit the detector 10 to operate on AC power, so that batteries are not needed so long as AC power is present. A standard modular telephone jack 32 is accessible through another opening in the back plate 23, and a switch bank 36 is accessible through yet another opening therein. The switch bank 36 has eight small switches, and is preferably a single component commonly referred to as a dual in-line package (DIP) switch. Adjacent the switch bank 36 is a further LED 37 which is visible through a hole in the back plate 23. The back plate 23 also has secured to it a keypad 39 having on its left side twelve push buttons in the standard telephone configuration, and having on its right side four control push buttons which will be described in more detail later. When one of the sixteen push buttons is pushed, the LED 37 flashes if the detector 10 is dialing in pulse mode, or stays on if the detector 10 is dialing in tone mode.

Figure 4:
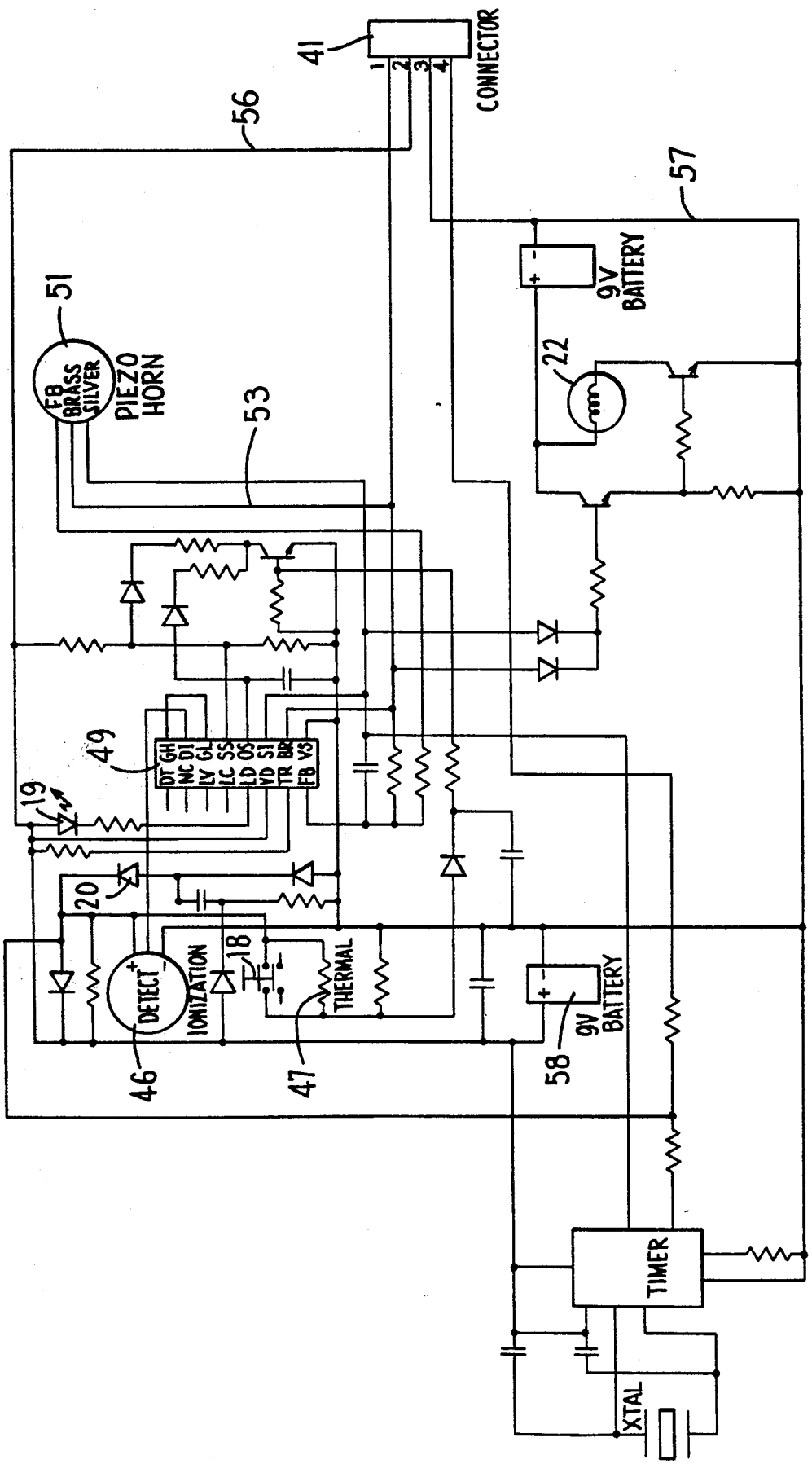
FIGS. 4 and 5 are schematic diagrams of respective portions of an electrical circuit within the smoke detector of FIG. 1.
Figure 5:
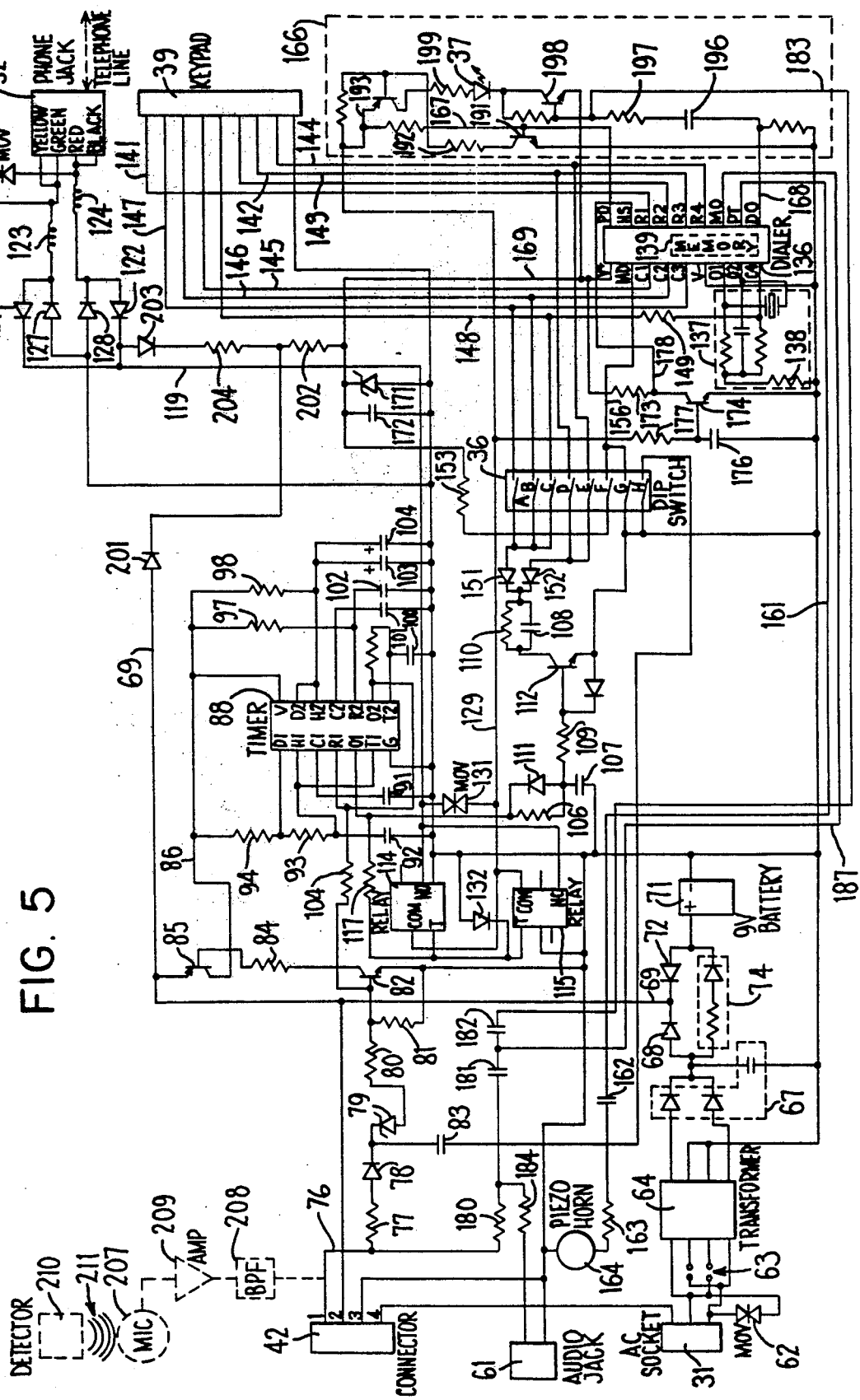

The housing 11 of smoke detector 10 has within it two circuit boards, FIG. 4 showing the circuitry on one circuit board and FIG. 5 showing the circuitry on the other circuit board. The circuit boards have respective connectors 41 and 42, which can be releasably coupled to each other in order to electrically couple the circuit boards.

The circuit of FIG. 4 is, aside from the provision of the connector 41 to couple it to the circuit of FIG. 5, a conventional smoke detector circuit of the type commonly found in household smoke detectors. It is therefore not described in detail, although a few features will be briefly described in order to facilitate an understanding of the present invention.

It will be noted that the circuit of FIG. 4 includes the previously-mentioned push-to-test button 18 (FIG. 1), operating LED 19, and escape light 22. The conventional circuit of FIG. 4 also includes a conventional ionization chamber 46 which can detect smoke particles and thus serves as a smoke sensor, and a conventional thermal sensor 47 having a resistance which varies in response to changes in temperature in order to serve as a sensor for the very hot air associated with a fire. Although the preferred embodiment uses a smoke sensor 46 and heat sensor 47, it will be recognized that there are other conventional sensors which could also be used, for example sensors which detect light, pressure, radio waves, magnetic fields, motion, and so forth. The sensors 46 and 47 are coupled to a smoke detector integrated circuit 49, which in the preferred embodiment is a Motorola MC14466, which in turn is coupled to a conventional piezo horn 51 and to the escape light 22. If either of the sensors 46 and 47 detects an alarm condition, the integrated circuit 49 will respond to the change in the output signal from the sensor by activating the escape lamp 22 and by producing on a line 53 a continuous audio frequency signal, the line 53 driving an audio input of the piezo horn 51 and causing the piezo horn 51 to produce a piercing noise at the audio frequency. Since the push-to-test button is connected in parallel with the thermal sensor 47, manually pressing the push-to-test button 18 creates an electrical short across the sensor 47 which is similar to the short created by the sensor 47 when it actually detects hot air, and thus pressing the button 18 causes the integrated circuit 49 to actuate the lamp 22 and piezo horn 51 in a manner similar to that just described for an actual alarm. If the battery 58 eventually becomes weak, the detector 49 will produce on line 53 a short intermittent "chirp" signal which causes the piezo horn to periodically beep or "chirp" at the audio frequency.

The push-to-test button 18, LED 19, escape light 22, ionization chamber 46, thermal sensor 47 and piezo horn 51 are all mounted directly on the circuit board for the circuit of FIG. 4 which in turn is mounted on the housing 11, and this circuit board is positioned closer to the front side 12 (FIG. 2) of the smoke detector 10 than the circuit board for the circuit of FIG. 5. Thus, the sensors 46 and 47 and the piezo horn 51 are positioned relatively close to and have unobstructed access to the slots 16 and 17 in the housing, and the push-to-test button 18, LED 19 and escape light 22 are positioned appropriately relative to the housing 11 (FIG. 1), without any need to directly mount them on the housing.

As mentioned above, the circuit of FIG. 4 is conventional except for the provision of the connector 41. The connector 41 is connected to four lines, three of which are important for purposes of the present invention. In particular, the connector 41 has two terminals respectively connected to lines 56 and 57, which are coupled to opposite sides of a battery 58, and a further terminal of the connector 41 is coupled to the line 53 carrying the audio signal supplied by the integrated circuit 49 to the piezo horn 51. Some conventional features shown in FIG. 4, such as the escape light 22, are optional and could be omitted without affecting the features which are the focus of the present invention.

Turning to the circuit of FIG. 5, it will be noted that the circuit includes the previously-mentioned AC socket 31, the phone jack 32, the switch bank 36, the LED 37, and the keypad 39. In the preferred embodiment, the keypad 39 is mounted directly on the back plate 23 (FIG. 3) of the housing and has a short integral cable which extends to and is soldered to the circuit board, but it will be recognized that the keypad could alternatively be mounted directly on the circuit board, or that a connector could be provided which would permit the keypad 39 to be physically disconnected from the smoke detector 10 and the circuit board in it. The AC socket 31, phone jack 32, switch bank 36 and LED 37 are mounted directly on the circuit board for the circuit of FIG. 5, and as mentioned above this circuit board is positioned near the back plate 23 and thus these components are all readily accessible through the associated openings in the back plate 23.

The circuit of FIG. 5 also includes an audio jack 61, which can optionally be connected to an external audio source such as a pre-recorded voice message announcing an alarm condition. In the normal configuration of the preferred embodiment, no external source is connected to the audio jack 61.

The AC socket 31 is coupled via a metal oxide varistor 62 and jumper terminals 63 to a transformer 64, the varistor 62 avoiding undesirable effects from voltage spikes on the AC line, and the jumper terminals 63 facilitating easy adaption of the system to different common household line voltages, such as 110 volts which is common in the United States and 220 volts which is common in Europe. The output of the transformer 64 is rectified and filtered at 67, and then supplied through a diode 68 to a power line 69. A conventional nine volt battery 71 has its positive terminal coupled through a diode 72 to the power line 69. When a source of AC power is connected to the socket 31, DC power from rectifier/filter 67 is supplied through diode 68 to power line 69 and is also supplied through a trickle-charging circuit 74 to the battery 71 in order to charge the battery 71. On the other hand, if the socket 31 is not connected to a source of AC power, or if there is a temporary AC power loss at socket 31, the battery 71 will supply power through diode 72 to the power line 69.

An audio signal line 76 is coupled by the connectors 41 and 42 to the audio signal on line 53 in the circuit of FIG. 4. In FIG. 5, the audio signal line 76 is supplied through a resistor 77, diodes 78 and 79, and bias resistors 80 and 81 to the base of a transistor 82 serving as a trigger switch. The node between diodes 78 and 79 is coupled through a capacitor 83 to a switch H of the switch bank 36, the other end of switch H being connected to ground. If switch H is open, the capacitor has no effect, and all audio signals on line 76 pass through diode 79 to transistor 82. On the other hand, if switch H is closed, capacitor 83 will serve as an AC filter which prevents the "chirp" signals due to a low battery from reaching transistor 82, but allows a continuous audio signal representing a true or simulated alarm to reach transistor 82.

The transistor 82 is coupled through a bias resistor 84 to the base of a power control transistor 85, which serves as a switch selectively supplying power to a power line 86 for a dual timer 88 and associated circuitry 91-94 and 97-103, the dual timer 88 preferably being an LM556 integrated circuit made by National Semiconductor Corporation. The dual timer 88 includes two independent timers, one having a trigger input T1 and an output O1, and the other having a trigger input T2 and an output O2.

The trigger input T2 of the second timer is automatically actuated when the transistor 85 is turned on and supplies power to the line 86, and this timer then actuates its output signal O2 for a period of two minutes. The output O2 of this timer is connected through a power hold resistor 104 to the base of transistor 82 so that transistor 82 remains latched on throughout the two minute period even if the audio signal at 76 ceases, and thus the transistor 82 will in turn keep the transistor 85 on for approximately two minutes so that line 86 carries power for approximately two minutes.

The output O2 is also coupled to and actuates the trigger input T1 of the other timer, which in turn actuates its output O1 for a period of approximately forty seconds, then deactuates its output for a period of approximately twenty seconds, then actuates its output again for a period of approximately forty seconds, and then deactuates its output again for a period of about twenty seconds, at which point the other timer should deactuate its output O2. Actuation of the output O1 causes a capacitor 107 to be charged through a resistor 106, which after a charging delay sends a signal through a resistor 109 to the base of a transistor 112 serving as a dial activation switch, which actuates transistor 112 so that capacitor 108 and resistor 110 produce a pulse which causes the circuit of FIG. 5 to automatically dial a telephone number through the phone jack 32 in a manner described in more detail later. The charging time for capacitor 107 creates a delay following actuation of the timer output O1 of the timer 88 in order to ensure that a dial tone has been obtained before dialing is actually initiated, and the capacitor 108 and resistor 110 determine the length of the pulse which initiates the dialing. Diode 111 discharges capacitor 107 after dialing.

The circuit of FIG. 5 includes either a relay 114 or a relay 115. The circuit board for FIG. 5 includes a respective "footprint" for each of the relays, but only one is present at any given time. They are functionally equivalent parts. The relay 114 is an electromechanical relay which in the preferred embodiment is a PRMA-1A05B made by CP Clare Corportation of Wakefield, Mass., whereas the relay 115 is a solid state relay which is preferably a LCA 110 made by the same company. Depending on the particular geographic locality in which the preferred embodiment will be used, one of the two relays 114 and 115 is selected and installed at the time the unit is manufactured in order to provide optimum compatibility with characteristics of the particular telephone system used in that locality. Also, solid-state relay 15 draws less power than electromechanical relay 14, and thus is preferably used for applications where there is likely to be any significant period of time during which operation is carried out under battery power. For purposes of describing the present invention, it will be assumed that the relay 114 is present and the relay 115 is absent, but all of the discussion hereinafter with respect to relay 114 is equally applicable to relay 115.

The output O1 of the timer 88 is coupled through a resistor 117 to a trigger input T of the relay 114, and thus when the timer output is activated the contact of the relay 114 closes and connects the normally open terminal NO to the common terminal COM. The normally open terminal NO is connected through a line 119, diodes 121 and 122 and inductors 123 and 124 to the phone jack 32, the inductors 123 and 124 and a metal oxide varistor 126 providing phone line spike clamping. Two further diodes 127 and 128 are connected between the respective inductors 123 and 124 and ground.

The common terminal COM of the relay 114 is coupled through a line 129 to a portion of FIG. 5 which is described in detail below and which, in response to actuation of the dial activation switch transistor 112, dials a telephone number. The relay 114 thus acts as the hook switch which can effect and interrupt the connection between the telephone line at phone jack 32 and the portion of FIG. 5 which effects dialing. A metal oxide varistor 131 is coupled to the line 119 to provide hook switch spike clamping, and a diode 132 is coupled between ground and the trigger input T of the relay 114 in order to clamp a negative inductive spike which can occur when the relay 114 opens to disconnect the circuit of FIG. 5 from the telephone line at phone jack 32.

Referring to the lower right corner of FIG. 5, a telephone dialer integrated circuit 136 is provided, which in the preferred embodiment is a MK53731, which is a commercially available part made by SGS-Thomson. An oscillator circuit 37 is coupled to the dialer integrated circuit 136. In this oscillator circuit, the element 138 is, in the preferred embodiment, a zero ohm jumper. The dialer integrated circuit 136 has an integral memory 139, where it stores the last number dialed.

The keypad 39 has four output lines 141-144 which respectively represent row one through row four, has four outputs 145-148 which respectively represent column one through column four, and has a further terminal which is connected to ground. When a button on the keypad is pushed, the corresponding row and column lines are each shorted to ground. For example, since as shown in FIG. 3 the key SS is in row two and column four, the keypad 39 grounds the lines 142 and 148 representing row two and column four when the button SS is manually pushed. The output lines 141-147 of the keypad 39 are each connected directly to a respective row or column input of the dialer integrated circuit 136, and the line 148 is coupled to a column input of circuit 136 by an element 149 which is a zero ohm jumper. The lines 146, 147 and 148 for columns two through four are each connected to one side of a respective one of the switches A-C of the DIP switch 36, and the other side of each of the switches A-C are coupled through a diode 151 to the collector of transistor 112. The lines 143 and 144 representing row three and row four are each connected to one side of a respective one of the switches D and E of the DIP switch 36, the other sides of these two switches each being connected through a diode 152 to the collector of transistor 112. Only one of the switches A-C is closed at any given point in time, and only one of the switches D or E is closed at any given point in time. Thus, when the transistor 112 is turned on in a manner already described above, it will essentially short the cathodes of diodes 151 and 152 to ground, so that a low voltage signal is supplied through diode 151 and the closed switch A, B or C on one of the lines 146-148, and a low voltage signal is supplied through diode 52 in one of the switches D or E on one of the lines 143 and 144, thus effectively grounding one of the row lines 146-148 and one of the column lines 143 and 144 in order to simulate manual pressing of a key on the keypad 39. If the simulated key is a digit key, the dialer integrated circuit 136 will dial that single digit through the phone jack 32. On the other hand, if the simulated key is the PRG key, the dialer integrated circuit 136 will dial a single telephone number which is stored in its last number dialed memory 139 and which may include several digits as well as a pause, flash or soft switch function. For example, the number could include several digits which dial a particular remote destination, followed by a pause function to give the telephone system time to reach the remote destination and obtain an answer, the pause being followed by one or more additional digits which are an identification code. The identification code may, for example, indicate the physical location of the detector 10. The integrated circuit 36 used in the preferred embodiment can store a number which, taking into account each digit and each function code, has a total length of 28 digits and/or function codes.

If one of the keys "0"-"9", "*" or "#" on the keypad 39 is pressed while the relay 114 is closed to connect the dialer integrated circuit 136 to the telephone line via phone jack 32, the dialer circuit 136 will dial the digit or symbol for each key as it is pressed, and also stores the sequence of pressed keys in the last number dialed memory 139. If the key PSE on the keypad 39 is pressed, a symbol representing a 1.1 second pause is added in the sequence stored in last number dialed memory 139. If the key SS is pressed to effect a "soft switch" function, the dialer integrated circuit 136 will store in the last number dialed memory 139 a code indicating that the automatic dialer circuit 136 is to be switched from pulse dialing mode to tone dialing mode (or is to remain in tone dialing mode if it is already in tone dialing mode). If the key PBX is pressed, the dialer integrated circuit 136 stores in its last number dialed memory 139 a code representing a function commonly referred to as a hook flash. If the key PRG is pressed, the automatic dialer circuit 136 does not store anything in its memory 139, but instead dials the entire number which is stored in the last number dialed memory 139.

A mode control input of the automatic dialer circuit 136 is connected by a mode line 156 to both of the switches F and G of the DIP switch 36, the other side of switch G being connected to ground and the other side of switch F being connected through a pull-up resistor 153 to a source of power. Only one of the switches F or G is closed at any given point in time. If the switch F is closed, the mode input of the dialer integrated circuit 136 is pulled to a high voltage to indicate that it should default to a tone dialing operational mode when power is applied to it, whereas if the switch G is closed the mode input will be grounded and will cause the dialer integrated circuit 136 to default to a pulse dialing mode when power is first applied to it. When the dialer integrated circuit 136 is operating in the pulse mode, it can be changed to the tone mode by the soft switch function mentioned above, which typically occurs partway through a sequence of digits being dialed. Once the dialer integrated circuit 136 is placed in the tone mode, either by default at power-up because switch G of DIP switch 36 is closed or due to execution of the soft switch function during a dialing sequence, the dialer integrated circuit will remain in tone mode and cannot be shifted to pulse mode.

The dialer integrated circuit 136 has a pacify output which is coupled by a line 161 through a capacitor 162 and resistor 163 to a conventional piezo horn 164. Each time a button on the keypad 39 is pressed, the dialer integrated circuit 136 produces a short audio signal on the pacify output which causes the piezo horn 164 to beep, so that the person who pressed the key on the keypad receives audible assurance that the unit has accepted the information sent by the key which was pressed.

The dialer integrated circuit 136 is interfaced to the telephone line by a dialer to phone line interface circuit 166, which is coupled to the line 129, and to a pulse output line 167 and a tone output line 168 of the dialer integrated circuit 136. When the relay 114 closes and supplies power from the telephone line through the line 129 to the interface circuit 166, the interface circuit 166 provides power to the dialer integrated circuit 136 on a line 169. A zener diode 171 is connected between the line 169 and ground in order to clamp the voltage for the dialer integrated circuit 136, and a capacitor 172 is also connected between the line 169 and ground in order to store energy and thus minimize voltage variations on the line 169 during pulse dialing. Several resistors in the interface circuit 166 which are not designated with reference numerals are bias resistors.

The power provided on line 169 is also supplied through a resistor 173 to bias a hook switch detect transistor 174. When the relay 114 closes and supplies power from the telephone line to the line 129, power from the line 129 charges a capacitor 176 through a resistor 177 until the base of transistor 174 reaches a voltage which turns the transistor 174 on, at which point the collector voltage of the transistor 174 is pulled to ground, so that voltage reduction occurs on a line 178 connecting the transistor collector to a hook switch input of the dialer integrated circuit 136 in order to notify the dialer integrated circuit 136 that it is now electrically coupled to the telephone line.

The audio frequency signal on line 76 is supplied through a resistor 180 and two coupling capacitors 181 and 182 to the interface circuit 166. In the event an audio signal were supplied to the audio jack 61, it would be supplied through a resistor 1B4 and the capacitors 181 and 182 to the interface circuit 166.

When the dialer integrated circuit 166 dials a number, it first produces a low voltage mute signal on line 187 which effectively grounds the node between capacitors 181 and 182 in order to prevent the audio signal from line 76 (or jack 61) from passing through capacitor 182 to the interface circuit 166. Then, if the dialer integrated circuit 136 is operating in pulse dialing mode, it will produce a pulse dialing output on its output line 167 which will drive the base of transistor 191, and through resistor 192 the transistor 191 will drive the base of transistor 193, which has its emitter coupled to the line 129, which in turn is coupled through relay 114 and line 119 to the telephone line at phone jack 32. Alternatively, if the dialer integrated circuit 136 is operating in tone dialing mode, or if at some point during dialing it is switched from pulse dialing mode to tone dialing mode, it maintains the pulse output signal on line 167 at a voltage which keeps the transistors 191 and 193 turned on, and it produces a tone output signal with the appropriate conventional audio frequencies for tone dialing on the output line 168, which is applied through a coupling capacitor 196 and a resistor 197 to the base of a transistor 198. The transistor 198 amplifies the tone output signal, and this signal is then supplied through the LED 37, a resistor 199 and the transistor 193 to the line 129, and thus through the relay 114 and line 119 to the telephone line at phone jack 32. Once the dialer integrated circuit 136 has completed the dialing, it raises the voltage of the mute signal on line 187, so that the audio signal from line 76 (or from jack 61) is supplied through capacitors 181 and 182 to the base of transistor 198 in interface circuit 166, and then transistor 198 amplifies this audio signal and supplies it through LED 37, resistor 199, transistor 193, line 129, relay 114, line 119 and phone jack 32 to the telephone line. This audio signal is supplied to the telephone line regardless of whether or not the call which is dialed is actually answered at its destination. In the event the call is answered, the audio tone will be clearly heard, and will sound substantially the same at the remote end of the telephone line as the sound being produced by the piezo horn 51 (FIG. 4) in the immediate local environment of the smoke detector 10.

When the relay 114 is open, the line 129 is not coupled through the relay 114 to the telephone line at phone jack 32, and thus the interface circuit 166 does not have power and is not supplying power on line 169 to the dialer integrated circuit 136. This avoids unnecessary power consumption, particularly where the smoke detector 10 is not connected to an AC power source or to the phone line and thus all power for the circuit of FIG. 5 is being drawn from the battery shown at 71. Nevertheless, a small amount of power must be supplied to the last number dialed memory 139 so that it does not lose the telephone number which is stored in it. For this purpose, the power line 69, which as discussed above receives power from the AC source 31 or the battery 71, is coupled through a diode 201 and a resistor 202 to the line 169, and provides just enough power on line 169 to maintain the data stored in the last number dialed memory 139. In addition, power received from the telephone line through the diodes 121 and 122 and phone jack 32 is supplied through a further diode 203, a resistor 204 and the resistor 202 to the power line 169. Thus, the number stored in last number dialed memory 139 will not be lost so long as resistor 202 can supply a small amount of current from any one of the three separate sources, namely the AC socket 31, the battery 71, or the telephone line at phone jack 32.

An optional feature shown in broken lines in FIG. 5 includes a conventional microphone 207, bandpass filter 208 and amplifier 209, the filter being closely tuned to the audible frequency band which contains the alarm sounds typically produced by existing smoke detectors using piezo horns of the type shown at 51 in FIG. 4. If a conventional smoke detector 210 at a remote location produces an alarm sound at 211, the microphone 207 will pick it up and will supply it to the line 76 to trigger the dialer circuitry of FIG. 5.

OPERATION

Referring to FIG. 4, so long as the sensors 46 and 47 do not detect an alarm condition and the push-to-test button 18 is not pressed, the smoke detector chip 49 will keep the escape lamp 22 off and will not drive the piezo horn 51 with an audio frequency signal. Thus, since there is no audio frequency signal on line 53, the corresponding line 76 in FIG. 5 will not have an audio signal, and thus will not be triggering the dialing circuit of FIG. 5. Consequently, the transistors 82 and 85 will be off, so that the transistor 85 is not supplying power to the timer circuit 88 and its associated components, and the relay 114 will be open so that power is not supplied from the telephone line through line 119, relay 114 and line 129 to the interface circuit 166 and the dialer integrated circuit 136 and associated components, and thus power consumption in the circuit of FIG. 5 will be minimized. The dialer integrated circuit 136 receives only a small amount of current through the resistor 202 via resistor 204 and/or diode 201, the small current being sufficient to maintain any number stored in last number dialed memory 139.

If at some point in time one of the sensors 46 and 47 in FIG. 4 detects an alarm condition, or if the push-to-test button 18 is pressed, the smoke detector chip 49 will detect the condition and will produce a high-pitched pulsing audio frequency signal on line 53 so that piezo horn 51 produces a piercing sound which will warn any person in the vicinity of the smoke detector 10 of the alarm condition. This audio frequency signal on line 53 is supplied through connectors 41 and 42 to the corresponding line 76 in FIG. 5, where it passes through resistor 77, diodes 78 and 79 and resistor 80 to turn on transistor 82, which in turn turns on transistor 85 so that power is supplied from line 69 to line 86. When this power is supplied to line 86, the dual timer circuit 88 will be energized, and timer output O2 will be automatically activated for a period of two minutes. This in turn latches the transistor 82 on through resistor 117, and activates the timer T1 for an initial period of approximately forty seconds, so that it activates its output O1 for approximately forty seconds. The forty second period may be slightly longer on the first actuation than on subsequent actuations because the voltage will start changing from 0 volts the first time and from about ½ the voltage on line 86 thereafter, but this minor variation in duration can be ignored for purposes of the present invention. The output O1 turns on the relay 114 (or the relay 115 if it is present in place of the relay 114), thereby closing the relay 114 so that the telephone line at phone jack 32 is coupled through the inductors 123 and 124, the diodes 121 and 122, the line 119, the relay 114 and line 129 to the interface circuit 166, which in turn applies power received from the phone line to the dialer integrated circuit 136 and associated components. Coupling of the circuit 166 through the relay 114 to the telephone line changes the impedance seen by the telephone line, and thus the telephone line will subsequently supply a dial tone.

In addition to turning on the relay 114, the timer output O1 also charges the capacitor 107 through resistor 106, the charging of the capacitor 107 producing a delay which is longer than the maximum time required for the dial tone to be obtained. Thus, at some point after a dial tone is obtained, the capacitor 107 will be charged sufficiently to turn on transistor 112 so that it causes capacitor 108 and resistor 110 to produce a pulse, which through diodes 151 and 152 and the switches A-E of DIP switch 36 produces a signal to dialer integrated circuit 136 which causes it to carry out a dialing operation. If switches A-E of DIP switch 36 are set to emulate a single digit of the keypad 39, then the dialer integrated circuit 136 will initiate dialing of this single digit. On the other hand, if the switches A-F of the DIP switch 36 are set to emulate the PRG button of the keypad 39, the dialer integrated circuit will initiate dialing of the number stored in its last number dialed memory 139, which may be a multi-digit number and which may include a programmed pause, a programmed soft switch to effect a change from default pulse dialing to tone dialing mode, or a programmed flash condition. In either case, during dialing the dialer integrated circuit 136 produces a low voltage on its mute output signal 187 which effectively disables the node between capacitors 181 and 182, so the audio frequency signal on line 76 is not supplied to the interface circuit 166. Then, appropriate outputs are produced on the line 167 for pulse dialing or on the line 168 for tone dialing until the complete telephone number has been dialed, the sequence of pulses or tones being supplied through the transistor 193, line 129, relay 114, line 119, diodes 121 and 122, and inductors 123 and 124 to the telephone line at phone jack 32. When the dialer integrated circuit 136 has completed dialing the number, it raises the voltage of its mute output signal on line 187 so that the piercing audio frequency signal from line 76 is supplied through resistor 180 and capacitors 181 and 182 to the interface circuit 166, which supplies it through transistor 193, line 129, relay 114 and line 119 to the telephone line at phone jack 32. This audio frequency signal is supplied to the telephone line regardless of whether the call is answered at the remote end.

After forty seconds, the shorter timer in dual timer 88 expires and lowers its output O1, which in turn opens the relay 114 to disconnect the dialer circuit from the telephone line. This occurs regardless of whether or not the call was answered, and is equivalent to hanging up the receiver on a normal telephone in order to release the telephone line. This timer remains deactivated for about twenty seconds in order to allow the remote telephone system to detect and accept the release of the telephone line. Then, since the other timer output O2 is still activated (because it remains activated for two minutes), the shorter timer is triggered again and activates its output O1 for an additional forty second period, which causes the dialing sequence just described to be repeated. At the end of this forty second period, the timer output O1 is again deactivated for twenty seconds in order to release the telephone line. At the end of this twenty second period, the other timer with the two minute output O2 will expire, thereby terminating the latch signal supplied through resistor 104 to the base of transistor 82 in order to keep transistor 82 on. If the audio frequency signal on line 76 has terminated, the entire circuit of FIG. 5 will return to its original quiescent condition. On the other hand, if the audio alarm signal on line 76 is still present, it will keep the transistor 82 on, which will in turn keep the transistor 85 on, so that power continues to be supplied to line 86 and thus the longer timer will again activate its output O2 for a further two minute period, during which the entire sequence of events previously described will be repeated. Each time the longer timer with the two minute output signal at O2 expires, it will be retriggered if the audio alarm signal is still present on line 76.

If the smoke detector 49 of FIG. 4 detects that the voltage from battery 58 is unacceptably low, it will in a conventional manner produce an intermittent audio frequency signal on line 53 which will cause the piezo horn 51 to periodically chirp. In FIG. 5, if the switch H of the DIP switch 36 is closed, this short audio signal periodically appearing on line 76 will pass through resistor 77 and diode 78, but will be AC coupled through capacitor 83 and switch 86 to ground, and thus will not reach the base of transistor 82 and will not trigger dialing by the circuit of FIG. 5. On the other hand, if the switch H is open, the capacitor 83 will be ineffective, and even the short chirp signal will briefly turn on the transistor 82 and thus trigger a dialing operation.

In order to enter a telephone number into the last number dialed memory 139 of the dialer integrated circuit 136, the operator opens switches A-E of the DIP switch 36, and then presses the push-to-test button 18 (FIG. 4) in order to simulate an alarm condition and thus produce an audio frequency signal on line 76 in FIG. 5 which will activate the dialing circuit of FIG. 5. In particular, the circuit of FIG. 5 will be activated for dialing in a manner already described, except that activation of the transistor 112 will not simulate pressing of keys on the keypad because the switches A-E of DIP switch 36 will all be open. Then, the operator manually enters the dialing sequence using the buttons of the keypad, including the PBX, SS and PSE buttons to enter any needed flash, soft switch shift from pulse mode to tone mode) or pause function. As the number is dialed, the dialer integrated circuit 136 and the interface circuit 166 will send the entire dialing sequence out over the telephone line through relay 114, and the LED 37 will flash to provide visual feedback each time a key is pressed, while the piezo horn 164 will beep to provide audio feedback. Simultaneously, the number is stored in the last number dialed memory 139. After the number has been dialed, the switches C and E of the DIP switch 36 are closed so that pressing of the PRG button on the keypad will be automatically simulated every time dialing mode is entered, and thus the number stored in memory 39 will be automatically dialed.

Although a preferred embodiment of the invention has been disclosed in detail for illustrative purposes, it will be recognized that there are variations or modifications of the preferred embodiment, including the rearrangement of parts, which lie within the scope of the present invention.

The embodiments of the invention in which an exclusive property or privilege is claimed are defined as follows:

1. An apparatus comprising: sensor means for detecting an alarm condition; a telephone dialer circuit and means for facilitating coupling of said telephone dialer circuit to a telephone line, said telephone dialer circuit having a plurality of keypad matrix inputs; means coupled to said matrix inputs of said dialer circuit and responsive to detection of said alarm condition by said sensor means for simulating a manual key press at said matrix inputs to said dialer circuit, said dialer circuit including means responsive to said simulated manual key press for automatically dialing a telephone number; means for generating an alarm signal at an audible frequency in response to detection of said alarm condition by said sensor means; and sound generating means responsive to said alarm signal for producing an audible sound at said audible frequency; said telephone dialer circuit including means for applying to the telephone line said alarm signal at said audible frequency after said automatic dialing of said telephone number; wherein said telephone dialer circuit includes means responsive to said automatic dialing for thereafter waiting a predetermined period of time while said alarm signal is applied to said telephone line, for thereafter interrupting said coupling of said telephone dialer circuit to said telephone line, for thereafter waiting a further predetermined period of time, for thereafter causing said telephone dialer circuit to again effect said automatic dialing, and for thereafter applying to the telephone line said alarm signal at said audible frequency, said audible frequency being applied to said telephone line regardless of whether a remote end of said telephone line is answered; and wherein said telephone dialer circuit includes memory means for storing a first telephone number and includes manually settable switch means for specifying a second telephone number and for selecting one of said first and second telephone numbers, said telephone dialer circuit being responsive to said simulated manual key press for automatically dialing said selected one of said first and second telephone numbers.

2. An apparatus comprising: smoke detector means for generating an output signal in response to detection of smoke; means responsive to said output signal from said smoke detector means for generating an alarm signal at an audible frequency; sound generating means responsive to said alarm signal for generating audible sound at said audible frequency in the region of said smoke detector; a dialer integrated circuit having memory means for storing a telephone number which was most recently dialed by said dialer integrated circuit; first means for facilitating connection of said dialer integrated circuit to a telephone line; and second means directly responsive to said alarm signal at said audible frequency for causing said dialer integrated circuit to automatically dial the telephone number stored in said memory means; including switch means for specifying one of a single digit and said telephone number stored in said memory means, said second means being responsive to said switch means for causing said dialer integrated circuit to automatically respectively dial said single digit and said telephone number stored in said memory means when said switch means is respectively selecting said single digit and said telephone number stored in said memory means; wherein said dialer integrated circuit has a plurality of row inputs and a plurality of column inputs, and wherein said switch means includes a plurality of switches each coupled to a respective one of said row and column inputs, and includes means for applying to said switches a dial activation signal in response to said alarm signal.

3. An apparatus according to claim 2, including a keypad having manually operable push buttons and means for causing said dialer integrated circuit to dial a telephone number sequence entered through successive manual actuation of respective keys on said keypad and to simultaneously store said telephone number sequence in said memory means, said keypad having outputs coupled to said row and column inputs of said dialer integrated circuit.

4. An apparatus according to claim 4, including manually settable switch means for specifying said single digit.

5. An apparatus according to claim 2, wherein said second means includes means responsive to said automatic dialing for waiting a predetermined time interval, for causing said first means to interrupt said connection of said dialer integrated circuit to said telephone line, for thereafter waiting a further predetermined time interval, and for then causing said dialer integrated circuit to again effect said automatic dialing.

6. An apparatus according to claim 2, wherein said telephone number stored in said memory means includes a code which causes said dialer integrated circuit to pause when dialing said telephone number, and includes thereafter at least one identification digit code.

7. An apparatus according to claim 2, wherein said dialer integrated circuit includes means for effecting pulse dialing and means for effecting tone dialing, and wherein said telephone number stored in said memory means includes a code for causing said dialer integrated circuit to switch from pulse dialing to tone dialing.

8. An apparatus according to claim 2, wherein said telephone number stored in said memory means includes a code causing said dialer integrated circuit to produce a flash condition on said telephone line.

9. An apparatus according to claim 2, including means for supplying power from said telephone line to said memory means in said dialer integrated circuit.

10. An apparatus according to claim 9, including a battery for supplying power to said dialer integrated circuit, said first means and said second means; power supply means for deriving DC power from an AC source and supplying said DC power to said dialer integrated circuit, said first means and said second means; and means for supplying power from said battery and said transformer means to said memory means in said dialer integrated circuit.

11. An apparatus comprising: sensor means for detecting an alarm condition; a telephone dialer circuit and means for facilitating coupling of said telephone dialer circuit to a telephone line, said telephone dialer circuit having a plurality of keypad matrix inputs; and first means coupled to said matrix inputs of said dialer circuit and responsive to detection of said alarm condition by said sensor means for simulating a manual key press at said matrix inputs to said dialer circuit, said dialer circuit including second means responsive to said simulated manual key press for automatically dialing a telephone number; wherein said dialer circuit includes a dialer integrated circuit having memory means for storing a telephone number which was most recently dialed by said dialer integrated circuit and which is said telephone number automatically dialed in response to said simulated manual key press; and wherein said first means includes switch means for specifying one of a single digit and said telephone number stored in said memory means, said second means being responsive to said switch means for causing said dialer integrated circuit to automatically respectively dial said single digit and said telephone number stored in said memory means when said switch means is respectively selecting said single digit and said telephone number stored in said memory means.

12. An apparatus according to claim 11, including means for generating an alarm signal at an audible frequency in response to said output signal from said sensor means; and sound generating means responsive to said alarm signal for producing an audible sound at said audible frequency; said telephone dialer circuit including means for applying to the telephone line said alarm signal at said audible frequency after said automatic dialing of said telephone number.

13. An apparatus according to claim 3, including a housing having therein said sensor means, said telephone dialer circuit and said means coupled to said matrix inputs; and means for facilitating attachment of said housing to a surface of a ceiling so that a back side of said housing faces said surface; said means for facilitating coupling including connector means on said back side of said housing for facilitating a releasable coupling of said dialing means to the telephone line.

14. An apparatus according to claim 11, including microphone means responsive to audible sounds in the region of said sensor means for generating an electrical signal representative of said audible sounds; wherein said telephone dialer circuit applies to the telephone line said electrical signal representative of said audible sounds after said dialing of said telephone number.

15. An apparatus comprising: sensor means for detecting an alarm condition; a telephone dialer circuit and means for facilitating coupling of said telephone dialer circuit to a telephone line, said telephone dialer circuit having a plurality of keypad matrix inputs; means coupled to said matrix inputs of said dialer circuit and responsive to detection of said alarm condition by said sensor means for simulating a manual key press at said matrix inputs to said dialer circuit, said dialer circuit including means responsive to said simulated manual key press for automatically dialing a telephone number; means for generating an alarm signal at an audible frequency in response to detection of said alarm condition by said sensor means; and sound generating means responsive to said alarm signal for producing an audible sound at said audible frequency; said telephone dialer circuit including means for applying to the telephone line said alarm signal at said audible frequency after said automatic dialing of said telephone number; and wherein said telephone dialer circuit includes means for producing a mute signal during dialing, and means responsive to actuation and deactuation of said mute signal for respectively interrupting and effecting application of said alarm signal to said telephone line.

16. An apparatus according to claim 15, wherein said telephone dialer circuit includes means for producing tones for tone dialing, amplifier means for amplifying said tone dialer tones during dialing and said alarm signal after dialing, and means coupling an output of said amplifier to said telephone line.

17. An apparatus according to claim 15, wherein said telephone dialer circuit includes means responsive to said automatic dialing for thereafter waiting a predetermined period of time while said alarm signal is applied to said telephone line, for thereafter interrupting said coupling of said telephone dialer circuit to said telephone line, for thereafter waiting a further predetermined period of time, for thereafter causing said telephone dialer circuit to again effect said automatic dialing, and for thereafter applying to the telephone line said alarm signal at said audible frequency, said audible frequency being applied to said telephone line regardless of whether a remote end of said telephone line is answered.

18. An apparatus according to claim 15, wherein said telephone dialer circuit includes memory means for storing a first telephone number and includes manually settable switch means for specifying a second telephone number and for selecting one of said first and second telephone numbers, said telephone dialer circuit being responsive to said simulated manual key press for automatically dialing said selected one of said first and second telephone numbers; and including a housing having therein said sensor means and said telephone dialer circuit, said manually settable switch means being supported on said housing so as to be externally manually accessible.

19. An apparatus according to claim 15, including a housing having therein said sensor means, said telephone dialer circuit and said means coupled to said matrix inputs; and means for facilitating attachment of said housing to a surface of a ceiling so that a back side of said housing faces said surface, said means for facilitating coupling including connector means on said back side of said housing for facilitating a releasable coupling of said dialing means to the telephone line; wherein said ceiling has a telephone line which is coupled to said means for facilitating connection on said back side of said housing and which extends away from said housing.

20. An apparatus comprising: smoke detector means for generating an output signal in response to detection of smoke; means responsive to said output signal from said smoke detector means for generating an alarm signal at an audible frequency; sound generating means responsive to said alarm signal for generating audible sound at said audible frequency in the region of said smoke detector; a dialer integrated circuit having memory means for storing a telephone number which was most recently dialed by said dialer integrated circuit; first means for facilitating connection of said dialer integrated circuit to a telephone line; and second means directly responsive to said alarm signal at said audible frequency for causing said dialer integrated circuit to automatically dial the telephone number stored in said memory means; including switch means for specifying one of a single digit and said telephone number stored in said memory means, said second means being responsive to said switch means for causing said dialer integrated circuit to automatically respectively dial said single digit and said telephone number stored in said memory means when said switch means is respectively selecting said single digit and said telephone number stored in said memory means; wherein said second means includes means responsive to said automatic dialing for waiting a predetermined time interval, for causing said first means to interrupt said connection of said dialer integrated circuit to said telephone line, for thereafter waiting a further predetermined time interval, and for then causing said dialer integrated circuit to again effect said automatic dialing; wherein said means responsive to said automatic dialing includes a first timer which is started in response to said alarm signal and has a time interval which is twice the sum of said first-mentioned and further predetermined time intervals, means responsive to said first timer being respectively actuated and deactuated for respectively supplying and terminating power to portions of said dialer integrated circuit other than said memory means thereof, a second timer which is actuated for said first-mentioned predetermined time interval in response to said first timer being actuated and which has means for preventing reactuation of said second timer for said further predetermined time interval following expiration of said first-mentioned predetermined time interval, said first means effecting said connection of said dialer integrated circuit to said telephone line while said second timer is actuated, and said second means including means responsive to actuation of said second timer for effecting said automatic dialing of the telephone number by said dialer integrated circuit a predetermined time period after the start of said first-mentioned predetermined time interval, said predetermined time period having a duration substantially less than the duration of said first-mentioned predetermined time interval.

21. An apparatus comprising a housing having therein a circuit and a battery for supplying power to said circuit, said circuit including: smoke detector means for generating an output signal in response to detection of smoke; means responsive to said output signal from said smoke detector means for generating a substantially continuous first alarm signal at an audible frequency on an alarm line; means for monitoring said battery and for producing an intermittent second alarm signal at an audible frequency on said alarm line in response to said battery reaching a predetermined level of discharge; sound generating means for generating audible sound in response to the presence of either of said alarm signals on said alarm line; selectively actuable filter means having an input coupled to said alarm line and having an output, wherein said filter always passes said first alarm signal and respectively passes and blocks said second alarm signal when respectively actuated and deactuated; a dialer circuit coupled to said output of said filter means; means for facilitating coupling of said dialer circuit to a telephone line, said dialer circuit including means for automatically dialing a telephone number in response to the presence at said output of said filter means of either of said first and second alarm signals.

22. An apparatus according to claim 21, wherein said filter means includes a capacitor having a first end connected to said input and to said output of said filter and having a second end, and includes a manually actuable switch having a first end connected to said second end of said capacitor and having a second end connected to ground.

23. An apparatus according to claim 21, wherein said dialer circuit has a plurality of keypad matrix inputs; and wherein said means for automatically dialing includes means coupled to said matrix inputs of said dialer circuit and responsive to the presence at said output of said filter means of either of said first and second alarm signals for simulating a manual key press at said matrix inputs to said dialer circuit, said dialer circuit including means responsive to said simulated manual key press for effecting said automatic dialing of a telephone number.

24. An apparatus according to claim 23, wherein said dialer circuit includes a dialer integrated circuit having memory means for storing a telephone number which was most recently dialed by said dialer integrated circuit and which is said telephone number automatically dialed in response to said simulated manual key press.

25. An apparatus according to claim 23, including a matrix keypad having a plurality of matrix outputs which are coupled to respective said matrix inputs of said dialer circuit, including memory means in said dialer circuit for storing a first telephone number, including manually settable switch means for specifying a second telephone number and for selecting a respective one of said first and second telephone numbers, said means responsive to said alarm signal being responsive to said manually settable switch means for simulating a respective one of two manual key presses which respectively cause said dialer circuit to dial said first telephone number and said second telephone number.

26. An apparatus comprising: a housing; means for facilitating attachment of said housing to a surface of a ceiling so that a back side of said housing faces said surface; smoke detector means disposed within said housing for generating an output signal in response to detection of smoke; dialing means disposed within said housing for automatically dialing a telephone number in response to said output signal from said smoke detector means; and connector means on said back side of said housing for facilitating connection of said dialing means to a telephone line; wherein said ceiling has a telephone line which is coupled to said means for facilitating connection on said back side of said housing and which extends away from said housing; including means in said housing responsive to said output signal from said smoke detector means for generating an alarm signal at an audible frequency, and sound generating means disposed in said housing and responsive to said alarm signal for generating audible sound at said audible frequency, said dialing means automatically dialing said telephone number in response to said alarm signal, wherein said dialing means includes memory means for storing a telephone number which was most recently dialed by said dialing means and includes manually settable switch means for specifying a single digit telephone number and for selecting one of said single digit telephone number and said telephone number stored in said memory means, said telephone number dialed by said dialing means in response to said alarm signal being said selected one of said single digit number said telephone number in said memory means.

27. An apparatus according to claim 26, wherein said dialing means includes a dialer integrated circuit having therein said memory means and having a plurality of row inputs and a plurality of column inputs, a manually operable matrix keypad provided on said back side of said housing and having a plurality of row outputs and a plurality of column outputs which are respectively connected to said row inputs and said column inputs of said dialer integrated circuit, and means responsive to said alarm signal and said manually settable switch means and coupled to said row inputs and column inputs of said dialer integrated circuit for simulating a manual key press on said keypad in response to said alarm signal, said dialer integrated circuit being responsive to said simulated key press for dialing said selected one of said single digit number and said telephone number stored in said memory means, and wherein said dialer integrated circuit outputs a mute signal which is respectively actuated and deactuated during dialing, and including means responsive to actuation and deactuation of said mute signal for respectively interrupting and effecting application of said alarm signal to said telephone line.

* * * * *

UNITED STATES PATENT AND TRADEMARK OFFICE
CERTIFICATE OF CORRECTION

PATENT NO.   :   5 283 816
DATED        :   February 1, 1994
INVENTOR(S)  :   Leo A. GOMEZ DIAZ It is certified that error appears in the above-identified patent and that said Letters Patent is hereby corrected as shown below:

Column 14, line 67; change "transformer" to
    ---power supply---.

Column 15, line 29; change "said output signal from" to
    ---detection of said alarm
    condition by---.

Column 17, line 56; after "filter" insert
    ---means---.

Column 17, line 68; after "filter" insert
    ---means---.

Signed and Sealed this

Twelfth Day of July, 1994

Attest:

BRUCE LEHMAN

*Attesting Officer*     *Commissioner of Patents and Trademarks*